(12) United States Patent
Yang

(10) Patent No.: US 11,522,272 B2
(45) Date of Patent: Dec. 6, 2022

(54) ANTENNA ASSEMBLY AND TERMINAL

(71) Applicant: BEIJING XIAOMI MOBILE SOFTWARE CO., LTD., Beijing (CN)

(72) Inventor: Jingyu Yang, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 17/376,149

(22) Filed: Jul. 14, 2021

(65) Prior Publication Data
US 2022/0294098 A1  Sep. 15, 2022

(30) Foreign Application Priority Data

Mar. 11, 2021 (CN) .......................... 202110263719.4

(51) Int. Cl.
*H01Q 1/24* (2006.01)
*H04M 1/02* (2006.01)
*H01Q 13/16* (2006.01)

(52) U.S. Cl.
CPC ............. *H01Q 1/243* (2013.01); *H01Q 13/16* (2013.01); *H04M 1/0264* (2013.01)

(58) Field of Classification Search
CPC ................................ H01Q 13/16; H01Q 1/243
See application file for complete search history.

(56) References Cited

U.S. PATENT DOCUMENTS

2006/0164314 A1  7/2006  Yuanzhu
2019/0288392 A1  9/2019  Kim et al.
2021/0399428 A1  12/2021  Suzuki et al.

FOREIGN PATENT DOCUMENTS

CN   210899362 U   6/2020
WO   2020095436 A1  5/2020

OTHER PUBLICATIONS

European Search Report in the European application No. 21187137.1, dated Jan. 21, 2022,(7p).

*Primary Examiner* — Graham P Smith
(74) *Attorney, Agent, or Firm* — Arch & Lake LLP

(57) ABSTRACT

The present disclosure relates to an antenna assembly and a terminal. The antenna assembly includes: a metal protector of an image acquisition assembly, in which the metal protector includes a plurality of radiating slots which include a first radiating slot formed in a first direction and a second radiating slot formed in a second direction, and the first direction and the second direction are arranged at a first set angle; and a phase shift feed assembly configured to generate a first signal and a second signal having a phase difference of a second set angle, in which the first signal excites the first radiating slot, and the second signal excites the second radiating slot.

15 Claims, 5 Drawing Sheets

ANTENNA ASSEMBLY AND TERMINAL

CROSS-REFERENCE TO RELATED APPLICATION

This application is based upon and claims priority to Chinese Patent Application No. 202110263719.4, filed Mar. 11, 2021, the entire content of which is incorporated herein by reference for all purposes.

TECHNICAL FIELD

The present disclosure relates to the technical field of communications, and in particular to an antenna assembly and a terminal.

BACKGROUND

The way of life of human is changed with the popularization of positioning methods such as the Global Positioning System (GPS) and Beidou. Mobile phones, as the terminals with the highest frequency of access to the mobile Internet, install various location-based applications (APPs), which bring a revolutionary change to the transportation and travel methods of people. The positioning capacity of the mobile phone terminal is important, which largely depends on the signal receiving capacity of mobile phone antenna.

Electromagnetic waves of a satellite positioning antenna are circularly polarized. At present, considering the integrated body and the appearance of the mobile phone, the antenna is mostly built in the mobile phone. The common type of the positioning antenna in the mobile phone is Inverted-F Antenna (IFA). As shown in FIG. 1, a metal middle frame 10 of a terminal is combined with the antenna, a proper slot 11 is formed in a frame of an edge of the metal middle frame 10, and the metal frame serves as an antenna. Such an antenna form cannot control the polarization mode of the antenna, and are all linearly polarized, so that the polarization gain performance of the antenna is sacrificed. Moreover, for such an antenna form, the structural strength of the middle frame 10 is destroyed to a certain extent and the structural space of the middle frame is occupied, although the metal middle frame is effectively utilized.

SUMMARY

The present disclosure provides an antenna assembly and a terminal.

According to a first aspect of the present disclosure, an antenna assembly is provided. The antenna assembly includes: a metal protector of an image acquisition assembly, wherein the metal protector comprises a plurality of radiating slots, the plurality of radiating slots comprise a first radiating slot formed in a first direction and a second radiating slot formed in a second direction, and the first direction and the second direction are arranged at a first set angle; and a phase shift feed assembly configured to generate a first signal and a second signal having a phase difference of a second set angle, wherein the first signal excites the first radiating slot, and the second signal excites the second radiating slot.

According to a second aspect of the present disclosure, a terminal is provided. The terminal includes: an antenna assembly comprising: a metal protector of an image acquisition assembly, wherein the metal protector comprises a plurality of radiating slots, the plurality of radiating slots comprise a first radiating slot formed in a first direction and a second radiating slot formed in a second direction, and the first direction and the second direction are arranged at a first set angle; and a phase shift feed assembly configured to generate a first signal and a second signal having a phase difference of a second set angle, wherein the first signal excites the first radiating slot, and the second signal excites the second radiating slot; and a middle frame, wherein a phase shift feed assembly of the antenna assembly is disposed on the middle frame.

It should be understood that the above general description and following detailed description are merely exemplary and explanatory, and are not intended to limit the present disclosure.

BRIEF DESCRIPTION OF THE DRAWINGS

The accompanying drawings here, which are incorporated into the description and constitute a part of the description, illustrate examples that conform to the present disclosure and are used together with the description to explain the principles of the present disclosure.

DETAILED DESCRIPTION

Figure 1:
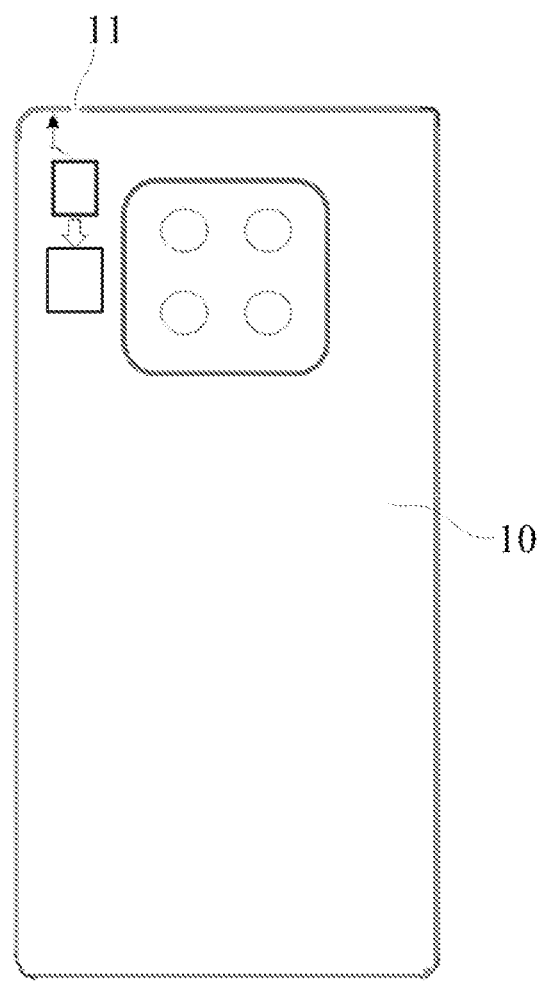
FIG. 1 is a schematic diagram of a terminal according to one or more examples of the present disclosure.

Exemplary embodiments will be described here in detail, and examples thereof are represented in the accompanying drawings. When the following description relates to the accompanying drawings, unless otherwise indicated, the same reference numeral in different accompanying drawings represents the same or similar elements. The implementations described in the following exemplary embodiments do not represent all implementations consistent with the present disclosure. On the contrary, they are merely examples of apparatuses consistent with some aspects of the present disclosure as detailed in the appended claims.

Terms used in the present disclosure are merely for describing specific examples and are not intended to limit the present disclosure. The singular forms "one", "the", and "this" used in the present disclosure and the appended claims are also intended to include a multiple form, unless other meanings are clearly represented in the context. It should also be understood that the term "and/or" used in the present disclosure refers to any or all of possible combinations including one or more associated listed items.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

It should be understood that although terms "first", "second", "third", and the like are used in the present disclosure to describe various information, the information is not limited to the terms. These terms are merely used to differentiate information of a same type. For example, without departing from the scope of the present disclosure, first information is also referred to as second information, and similarly the second information is also referred to as the first information. Depending on the context, for example, the term "if" used herein may be explained as "when" or "while", or "in response to . . . , it is determined that".

An example of the present disclosure provides an antenna assembly. The antenna assembly includes:

a metal protector 200 of an image acquisition assembly, in which the metal protector 200 includes a plurality of radiating slots 210, the radiating slots include a first radiating slot 211 formed in a first direction R1 and a second radiating slot 212 formed in a second direction R2, and the first direction R1 and the second direction R2 are arranged at a first set angle; and a phase shift feed assembly 300 configured to generate a first signal and a second signal having a phase difference of a second set angle, in which the first signal excites the first radiating slot 211, and the second signal excites the second radiating slot 212.

Without limitation, the first set angle may be 90 degrees or 120 degrees. The second set angle may be 90 degrees or 60 degrees, etc.

It will be understood that, the closer the wireless signals which are radiated by both the first radiating slot 211 and the second radiating slot 212 is to the circularly polarized wireless signals, the smaller the polarization loss of the wireless signals received by the wireless assembly from the satellite antenna is, and the better the positioning capacity of the wireless assembly is.

Figure 2:
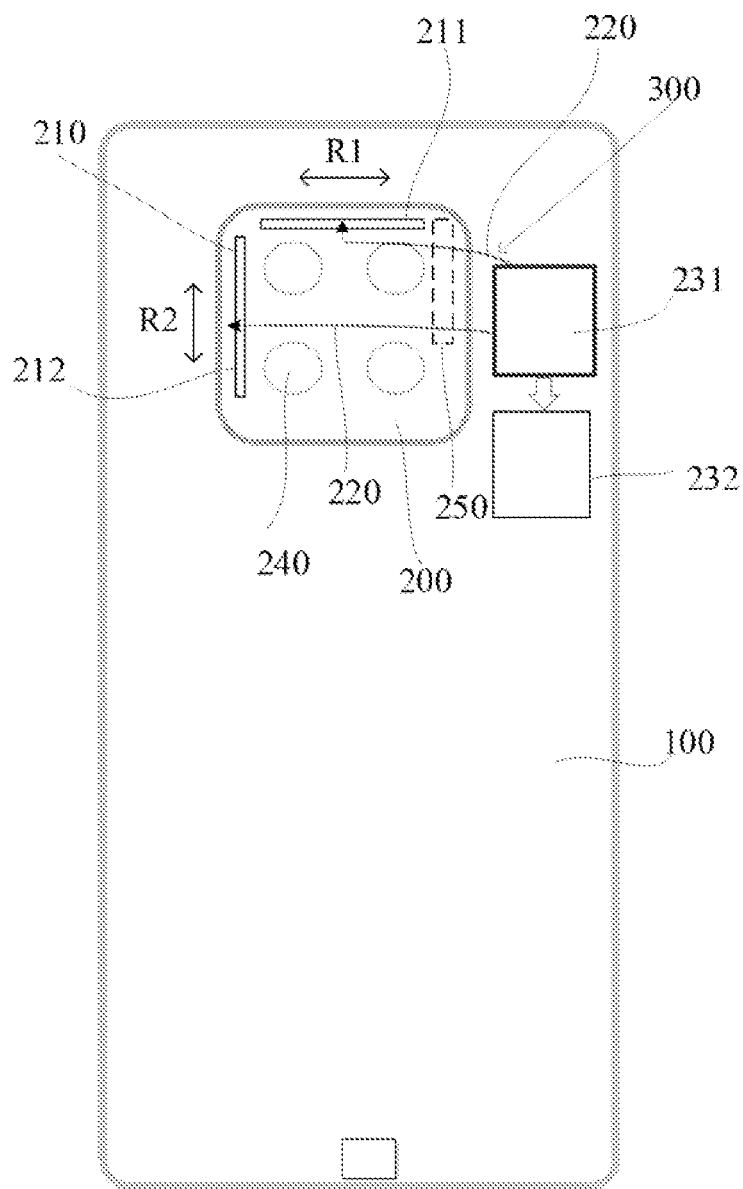
FIG. 2 is a first schematic diagram of a terminal according to one or more examples of the present disclosure.
Figure 4:
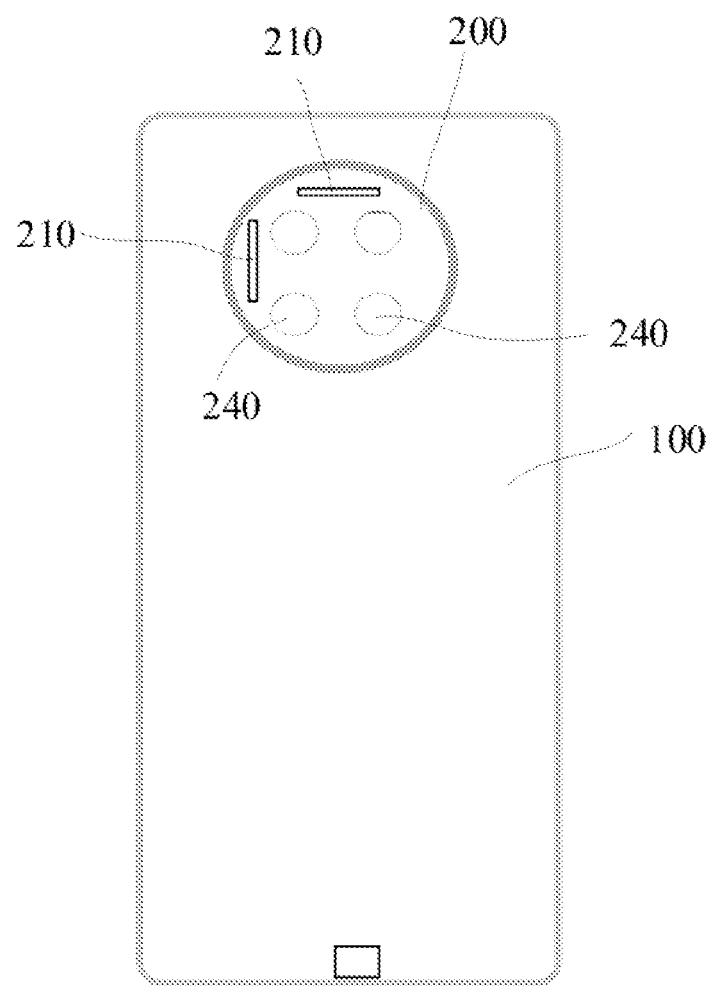
FIG. 4 is a third schematic diagram of a terminal according to one or more examples of the present disclosure.

Without limitation, each radiating slot 210 is elongated. The first direction R1 and the second direction R2 each refer to the direction where the longest edge of each radiating slot is oriented, and an angle between the first radiating slot and the second radiating slot is the same as an angle between the first direction R1 and the second direction R2. As shown in FIG. 2, when applied to a terminal, the first direction R1 may be a direction parallel to a short edge of the middle frame of the terminal, and the second direction R2 may be a direction parallel to a long edge of the middle frame. This is merely an example of the first direction R1 and the second direction R2. In other examples, the first direction R1 may be a direction parallel to a long edge of the middle frame, and the second direction R2 may be a direction parallel to a short edge of the middle frame. As shown in FIG. 4, the first direction R1 and the second direction R2 are both not parallel to the long edge or the short edge of the middle frame. Taking the metal protector 200 with a cross section in a rectangular shape as an example, the first radiating slot 211 is perpendicular to a first diagonal of the metal protector 200, and the second radiating slot 212 is perpendicular to a second diagonal of the metal protector 200, in which the first diagonal is perpendicular to the second diagonal.

Figure 3:
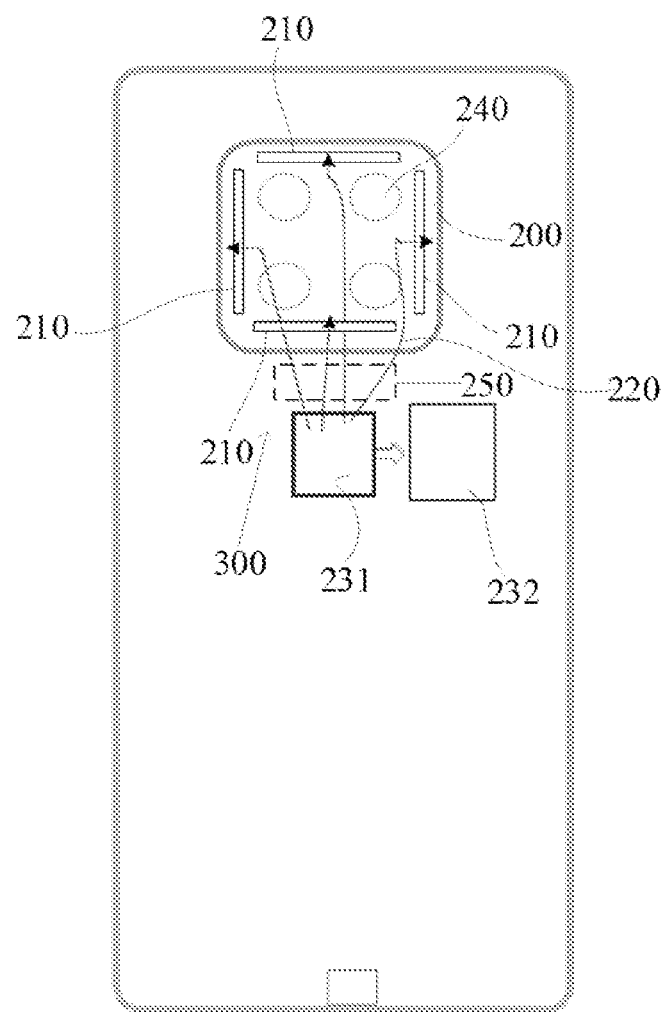
FIG. 3 is a second schematic diagram of a terminal according to one or more examples of the present disclosure.
Figure 5:
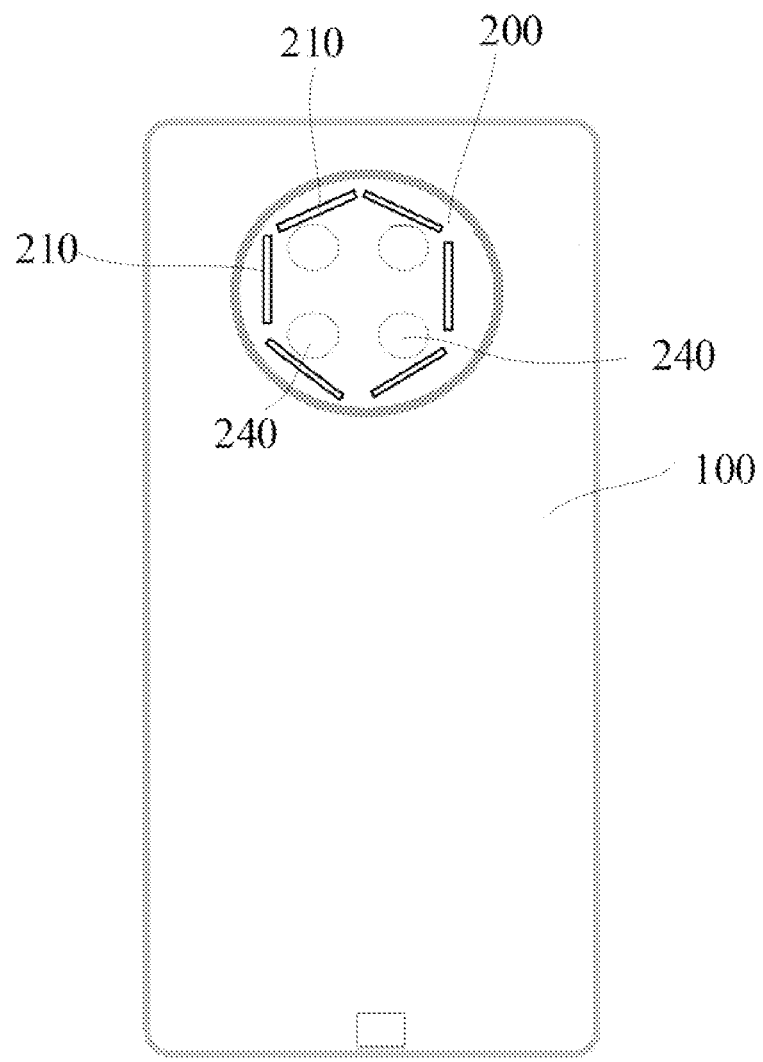
FIG. 5 is a fourth schematic diagram of a terminal according to one or more examples of the present disclosure.

The cross section of the metal protector 200 may have a generally rectangular shape as shown in FIG. 2 to FIG. 4, and may also have a circular shape as shown in FIG. 5. Alternatively, the cross section of the metal protector 200 may also have other shapes, which is not limited in the present disclosure.

In the example of the present disclosure, compared with the middle frame 100, the metal protector 200 has a smaller cross-sectional area. There are fewer devices on the metal protector 200, and the forming positions of the slots 210 are more flexible, so that the form of the antenna can be controlled more easily. For example, an antenna capable of transmitting and receiving the circularly polarized signals may be formed. Thus, the antenna is formed on the metal protector 200, so that the polarization mode of the antenna is more flexible, and it is more advantageous in improving the positioning capacity of the antenna.

As shown in FIG. 2 to FIG. 5, when applied to a terminal, when the terminal falls or is subjected to a collision, the metal protector 200 will firstly be subjected to an external force to reduce damage to the image acquisition assembly by the external force, thereby ensuring a protection effect on the image acquisition assembly. The radiating slots 210 are formed or disposed in the metal protector 200, and the phase shift feed assembly 300 excites the radiating slots in different directions to be capable of transmitting and receiving the wireless signals, so as to realize the antenna function without affecting the protection function of the metal protector 200. Compared with the terminal shown in FIG. 1, in the same structural space, such a structure can expand the arrangement space of the antenna and increase the number of antennas. Alternatively, the same number of antennas is provided, so that the number of antennas formed on the middle frame 100 can be reduced, the influence of the slots 210 on the structural strength of the middle frame 100 is reduced, and the space utilization of the terminal is improved, thereby effectively saving the structural space of the middle frame 100.

As known from the above examples, in the present disclosure, the metal protector of the image acquisition assembly is provided with a plurality of radiating slots, so that transmitting and receiving of wireless signals is realized through the radiating slots. The forming direction of the first radiating slot and the forming direction of the second radiating slot are different from each other and are arranged at the first set angle. The first radiating slot and the second radiating slot may radiate wireless signals in different polarization directions respectively under the excitation of the phase shift feed assembly 300. Such an antenna form improves the controllability of the antenna polarization mode, thereby facilitating achieving the circular polarization of the antenna signals. Moreover, in the examples of the present disclosure, the antennas are formed on the metal protector of the image acquisition assembly, so that the arrangement space of the antenna is enlarged, and the number of antennas formed in the middle frame is reduced, which is beneficial to improve the structural strength of the middle frame and improve the space utilization of the terminal, thereby effectively saving the structural space of the middle frame.

In some examples, the first direction R1 is perpendicular to the second direction R2, and the second set angle is 90 degrees. This is merely one example of the first direction R1 and the second direction R2. The first direction R1 and the second direction R2 are interchangeable, and the angle between the first direction R1 and the second direction R2 may be comprised between 0 degree and 360 degrees.

In some examples, the angle between the first radiating slot and the second radiating slot is 90 degrees, the phase difference between the first signal and the second signal is 90 degrees, and amplitude of the first signal is equal to amplitude of the second signal. The polarization mode of the wireless signals radiated by the radiating slots is circular polarization.

In some examples, the polarization mode of the wireless signals radiated by the radiating slots is right circular polarization.

In other optional examples, the metal protector includes two radiating slots.

As shown in FIG. 2 and FIG. 4, the metal protector includes at least one first radiating slot and at least one second radiating slot, thus, the metal protector includes at least two radiating slots.

Without limitation, if the metal protector includes a plurality of radiating slots 210, the number of the first radiating slots is equal to the number of the second radiating slots.

If the metal protector includes a plurality of radiating slots 210, two adjacent radiating slots 210 are arranged at an interval. As shown in FIG. 2 to FIG. 5, the two adjacent radiating slots do not communicate with one another.

As shown in FIG. 2 and FIG. 4, the number of the radiating slots is two. The number of the first radiating slot and the number of the second radiating slot are one, and the two radiating slots are arranged perpendicular to each other.

In some examples, the two radiating slots are arranged in a T shape.

In some examples, an end of one of the radiating slots 210 is arranged adjacent to an end of the other one of the radiating slots 210. As shown in FIG. 2 and FIG. 4, each of the two radiating slots is arranged along one of the edges of the metal protector 200, and an end of one of the radiating slots is arranged adjacent to an end of the other one of the radiating slots. This arrangement can make full use of the structural space of the metal protector 200, and realize the light transmitting function, the protection function and the antenna function of the metal protector 200 to the image acquisition assembly.

Without limitation, the two radiating slots 210 are symmetrically distributed on the metal protector 200.

In some examples, as shown in FIG. 2, the first radiating slot 211 and the second radiating slot 212 are located on two adjacent edges of the metal protector 200 respectively.

In other optional examples, the metal protector 200 includes four radiating slots 210.

As shown in FIG. 3, the number of the first radiating slots is two, and the number of the second radiating slots is two.

In other optional examples, the four radiating slots 210 are arranged adjacent to one another in end-to-end manner.

As shown in FIG. 3, each two adjacent radiating slots 210 are arranged perpendicularly to each other.

In other optional examples, the plurality of radiating slots 210 are distributed in an annular pattern.

The polarization mode of the wireless signals generated by the plurality of slots 210 distributed in an annular pattern is closer to circular polarization, which is beneficial to further improve the positioning function of the antenna assembly.

As shown in FIG. 3, the four slots 210 are distributed in a rectangular annular pattern.

In other optional examples, the metal protector 200 includes six radiating slots 210. The six radiating slots are arranged adjacent to one another in end-to-end manner, an angle between each two adjacent radiating slots 210 is 120 degrees, and the second set angle is 60 degrees.

As shown in FIG. 5, in the six radiating slots 210, the angle between each two adjacent radiating slots 210 is 120 degrees.

In other optional examples, the six radiating slots 210 are distributed in an annular pattern.

As shown in FIG. 5, the six radiating slots 210 are arranged adjacent to one another in end-to-end manner to form a generally hexagonal annular structure.

In other optional examples, the phase shift feed assembly 300 includes:

a processing assembly 231 configured to generate the first signal and the second signal having the phase different of the second set angle; and a feed assembly 250 connected to the processing assembly and configured to feed the radiating slots.

In some examples, the feed assembly 250 may be coupled with the metal protector 200 to feed the metal protector. For example, the feed assembly 250 further includes a feed tab. The feed tab is spaced apart from the metal protector and configured to feed the radiating slots through electromagnetic coupling.

The feed tab may be a metal sheet, which is located below the slot. That is, the metal sheet is located at an inner side of the metal protector.

In some examples, the feed tab may be connected to the processing assembly through a feeder line.

In some examples, the feed assembly 250 may be in contact with the metal protector 200 to feed the metal protector. For example, the feeder line of the feed assembly 250 is directly in contact with the metal protector to achieve contact feeding. Herein, the point at which the feeder line is in contact with the metal protector may serve as a feed point. In the case of contact feeding, an elastic feeder line such as an elastic sheet or an elastic probe may be adopted to connect the metal sheet and the processing assembly, so as to further guarantee the contact between the metal sheet and the metal protector, as well as the performance of the antenna assembly for transmitting and receiving signals.

In other optional examples, the feed assembly 250 includes:

a feeder line 220 electrically connected to the processing assembly and electrically connected to the feed point of each radiating slot 210. Herein, the feed point is located on an outer edge of each radiating slot 210 or an inner edge of each radiating slot 210. A distance between the outer edge of each radiating slot and a center of the metal protector 200 is larger than a distance between the inner edge of each radiating slot and the center of the metal protector 200.

FIG. 2 exemplarily illustrates a feed point located on the outer edge of each radiating slot 210.

Compared with the outer edge, the inner edge of each radiating slot is closer to the center of the metal protector.

Without limitation, the feeder line 220 includes a coaxial line, a microstrip line, a strip line or a Liquid Crystal Polymer (LCP) line.

Without limitation, one radiating slot 210 includes one feed point.

In some examples, the processing assembly 231 may adjust the amplitude and/or phase of the electrical signals transferred to the feed point, so that the first radiating slot 211 radiates the first signal in a first polarization direction, and the second radiating slot 212 radiates the second signal in a second polarization direction.

When applied to a terminal, the processing assembly 231 may be integrated in a Central Processing Unit (CPU) of the terminal.

In some examples, the feed point is located at a midpoint position of each radiating slot 210.

As shown in FIG. 2 and FIG. 4, the metal sheet of the feed point may be disposed at the midpoint of each radiating slot 210.

It will be understood that the position of the feed point may also slightly deviate from the midpoint position of each radiating slot. However, the feed point at the midpoint position of each radiating slot is more advantageous in transmitting and receiving the wireless signals.

In other optional examples, the antenna assembly further includes:

an insulating filler filled in each slot 210.

The insulating filler is filled in each slot 210, so that the strength of the metal protector 200 is improved on the basis of ensuring the function of the antenna for transmitting and receiving the wireless signals, which is beneficial to enhance the protection effect on the image acquisition assembly.

The filler may be made of an insulating material, such as resin or silicate compounds.

Without limitation, an injection molding material in a molten state may be filled into the slots 210 by injection molding, and then may be cooled and solidified to form an insulating filler.

In other optional examples, the metal protector 200 further includes:

a plurality of through holes 240 configured to allow ambient light to be incident to the image acquisition assembly.

The through holes 240 are located between the radiating slots 210 and the center of the metal protector 200.

As shown in FIG. 2 to FIG. 5, the lens of the image acquisition assembly may be aligned with each through hole 240, so as to receive light from an external environment and capture images.

The metal protector may include one or more through holes 240.

Compared with the radiating slots 210, the through hole 240 is closer to the center of the metal protector 200. That is, the through hole 240 is located within an area enclosed by the slots 210. Such a distribution may simultaneously achieve the protection effect of the metal protector 200 on the image acquisition assembly, the function of the image acquisition assembly for receiving light and the antenna function.

An example of the present disclosure further provides a terminal. The terminal includes:

an antenna assembly described in any of the above examples; and a middle frame 100, in which a phase shift feed assembly 300 of the antenna assembly is disposed on the middle frame 100.

In some examples, the terminal further includes a circuit board disposed on the middle frame 100. The antenna assembly is disposed on the circuit board. In practical applications, the circuit board may be a main board of the terminal.

Without limitation, the metal protector 200 may be disposed on the middle frame 100 by means of a snap connection, welding, bonding or a connection through a fastener such as a screw. Alternatively, the metal protector 200 and the middle frame 100 are integrally formed by molding.

The terminals include but not limited to mobile phones, tablets, laptops, unmanned aerial vehicles or wearable devices, etc.

In a specific example, the terminal is a mobile phone. As shown in FIG. 2, a radiating slot 210 of appropriate length is formed in the metal protector 200 of a mobile phone camera in a transverse direction and a longitudinal direction respectively, namely a first radiating slot 211 formed or disposed in the transverse direction and a second radiating slot 212 formed or disposed in the longitudinal direction. The first radiating slot 211 is excited to generate a transverse mode, so as to radiate the horizontally polarized waves. The second radiating slot 212 is excited to generate a longitudinal mode, so as to radiate the vertically polarized waves. The polarization modes of the electromagnetic waves in the two directions are orthogonal to each other. The feed point is connected to the processing assembly through a feeder line 220. The processing assembly generates signals having equal amplitude and a phase difference of 90 degrees to excite the first radiating slot 211 and the second exciting slot 212 respectively. That is, a right-hand circularly polarized signal is generated. The processing assembly transmits a received signal to a positioning processing unit 232 (generally a CPU) for post processing, so as to decode time information and position information.

In a specific example, as shown in FIG. 3, the antenna of the metal protector 200 is an antenna including four radiating slots. The processing assembly generates four signals having equal amplitude and a phase difference of 90 degrees to excite the four radiating slots 210 respectively. A right-hand circularly polarized signal is generated since the excitation signal has a phase difference of 90 degrees. This form has better circular polarization performance.

In other optional example, the metal protector 200 of the antenna assembly is electrically connected to the middle frame 100. The middle frame 100 forms at least a part of a ground plane of the antenna.

The middle frame 100 serves as the ground plane, which increases the grounding area of the antenna and facilitates improving the efficiency of the antenna.

In some examples, a part of an area of the metal protector 200 which is not connected to the feed point may serve as the ground plane of the antenna together with the middle frame 100.

In other optional examples, the terminal further includes:

a shell disposed on the middle frame 100, in which the shell is provided with an opening, and the antenna assembly is disposed in the opening and at least partially exposed outside the shell.

The antenna assembly is exposed to the outside, so that the interference of a device in the terminal, such as a circuit board or a loudspeaker, to the antenna is reduced.

In some examples, the shell is a battery case. The circuit board, the loudspeaker, the battery, the camera and other devices of the terminal may all be located between the middle frame 100 and the shell.

The features disclosed in the several product examples provided in the present disclosure can be combined arbitrarily without conflict to obtain new product examples.

A person skilled in the art can easily figure out other implementation solutions of the present disclosure after considering the specification and practicing the invention disclosed here. The present disclosure is intended to cover any variations, functions, or adaptive changes of the present disclosure. These variations, functions, or adaptive changes comply with general principles of the present disclosure and include common knowledge or a common technical means in the technical field that is not disclosed in the present disclosure. The specification and examples are merely considered to be exemplary, the actual scope and spirit of the present disclosure are pointed out by the claims.

It should be understood that the present disclosure is not limited to the precise structure that has been described above and illustrated in the accompanying drawings, and that various modifications and changes can be made without departing from the scope thereof. The scope of the present disclosure is limited only by the appended claims.

What is claimed is:

1. An antenna assembly, comprising:
 a metal protector of an image acquisition assembly, wherein the metal protector comprises a plurality of radiating slots, the plurality of radiating slots comprise a first radiating slot formed in a first direction and a second radiating slot formed in a second direction, and the first direction and the second direction are arranged at a first set angle; and a phase shift feed assembly configured to generate a first signal and a second signal having a phase difference of a second set angle, wherein the first signal excites the first radiating slot, and the second signal excites the second radiating slot.

2. The antenna assembly of claim 1, wherein the first direction is perpendicular to the second direction, and the second set angle is 90 degrees.

3. The antenna assembly of claim 2, wherein the metal protector comprises two radiating slots, the first radiating slot, and the second radiating slot.

4. The antenna assembly of claim 3, wherein one end of the first radiating slot is disposed adjacent to one end of the second radiating slot.

5. The antenna assembly of claim 2, wherein the metal protector comprises four radiating slots.

6. The antenna assembly of claim 5, wherein the four radiating slots are disposed adjacent to one another in an end-to-end manner.

7. The antennal assembly of claim 1, wherein the metal protector comprises six radiating slots, the six radiating slots are disposed adjacent to one another in an end-to-end manner, an angle between each two adjacent radiating slots is 120 degrees, and the second set angle is 60 degrees.

8. The antenna assembly of claim 1, wherein the plurality of radiating slots are disposed in an annular pattern.

9. The antenna assembly of claim 1, wherein the phase shift feed assembly comprises:

a processing assembly configured to generate the first signal and the second signal having the phase difference of the second set angle; and a feed assembly connected to the processing assembly and configured to feed the radiating slots.

10. The antenna assembly of claim 9, wherein the feed assembly comprises:

a feeder line electrically connected to the processing assembly and electrically connected to a feed point of each radiating slot;

wherein the feed point is located on an outer edge of each radiating slot or an inner edge of each radiating slot, and wherein a distance between the outer edge of each radiating slot and a center of the metal protector is larger than a distance between the inner edge of each radiating slot and the center of the metal protector.

11. The antenna assembly of claim 10, wherein the feed point is located at a midpoint position of each radiating slot.

12. The antenna assembly of claim 9, further comprising:

a feed tab, wherein the feed tab is spaced apart from the metal protector, and configured to feed the radiating slots through electromagnetic coupling.

13. A terminal, comprising:

an antenna assembly comprising:

a metal protector of an image acquisition assembly, wherein the metal protector comprises a plurality of radiating slots, the plurality of radiating slots comprise a first radiating slot formed in a first direction and a second radiating slot formed in a second direction, and the first direction and the second direction are arranged at a first set angle; and a phase shift feed assembly configured to generate a first signal and a second signal having a phase difference of a second set angle, wherein the first signal excites the first radiating slot, and the second signal excites the second radiating slot; and a middle frame, wherein a phase shift feed assembly of the antenna assembly is disposed on the middle frame.

14. The terminal of claim 13, wherein the metal protector of the antenna assembly is electrically connected to the middle frame, and the middle frame forms at least a part of a ground plane of the antenna assembly.

15. The terminal of claim 13, further comprising:

a shell disposed on the middle frame, wherein the shell is provided with an opening, and the antenna assembly is disposed in the opening and at least partially exposed outside the shell.

\* \* \* \* \*